Nov. 24, 1953          E. V. DETTMER          2,659,931
APPARATUS FOR STRETCHING FILM
Filed March 3, 1952                        7 Sheets-Sheet 1
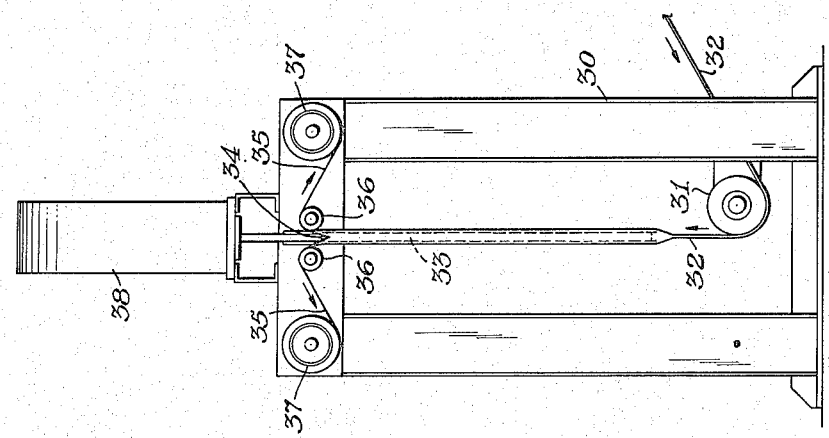
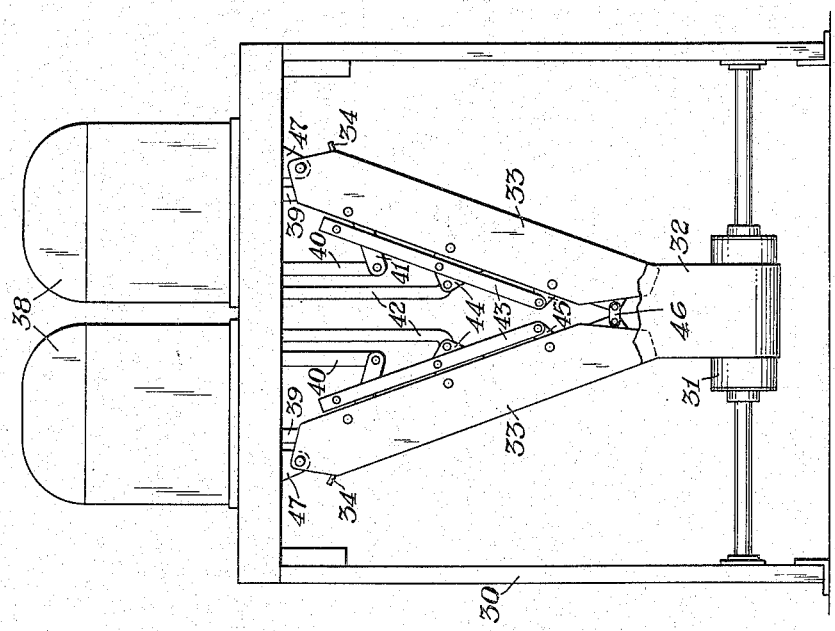
INVENTOR
Edward V. Dettmer
BY
Griswold & Burdick
ATTORNEYS Nov. 24, 1953     E. V. DETTMER     2,659,931
APPARATUS FOR STRETCHING FILM
Filed March 3, 1952     7 Sheets-Sheet 2
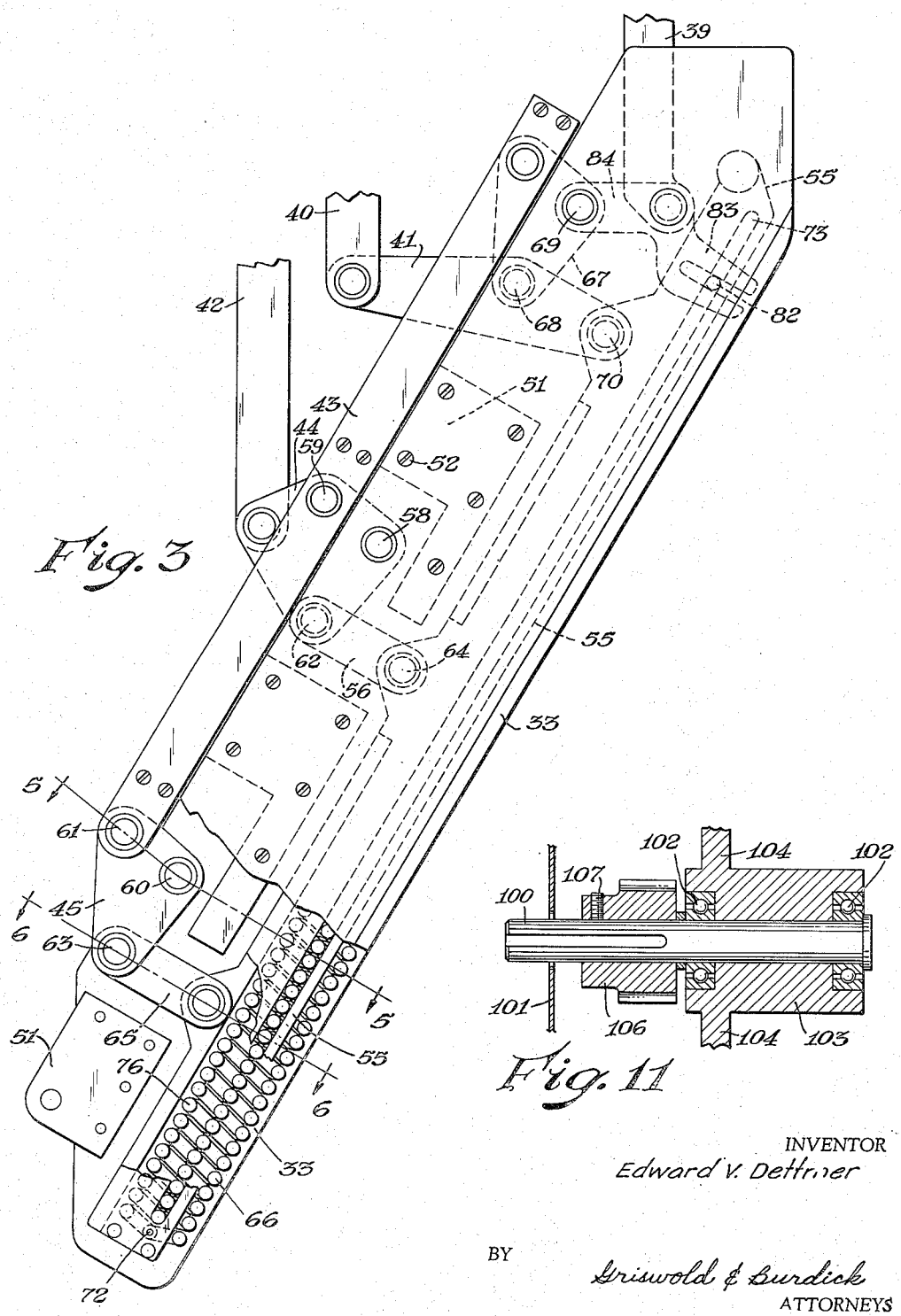
INVENTOR
Edward V. Dettmer
BY
Griswold & Burdick
ATTORNEYS

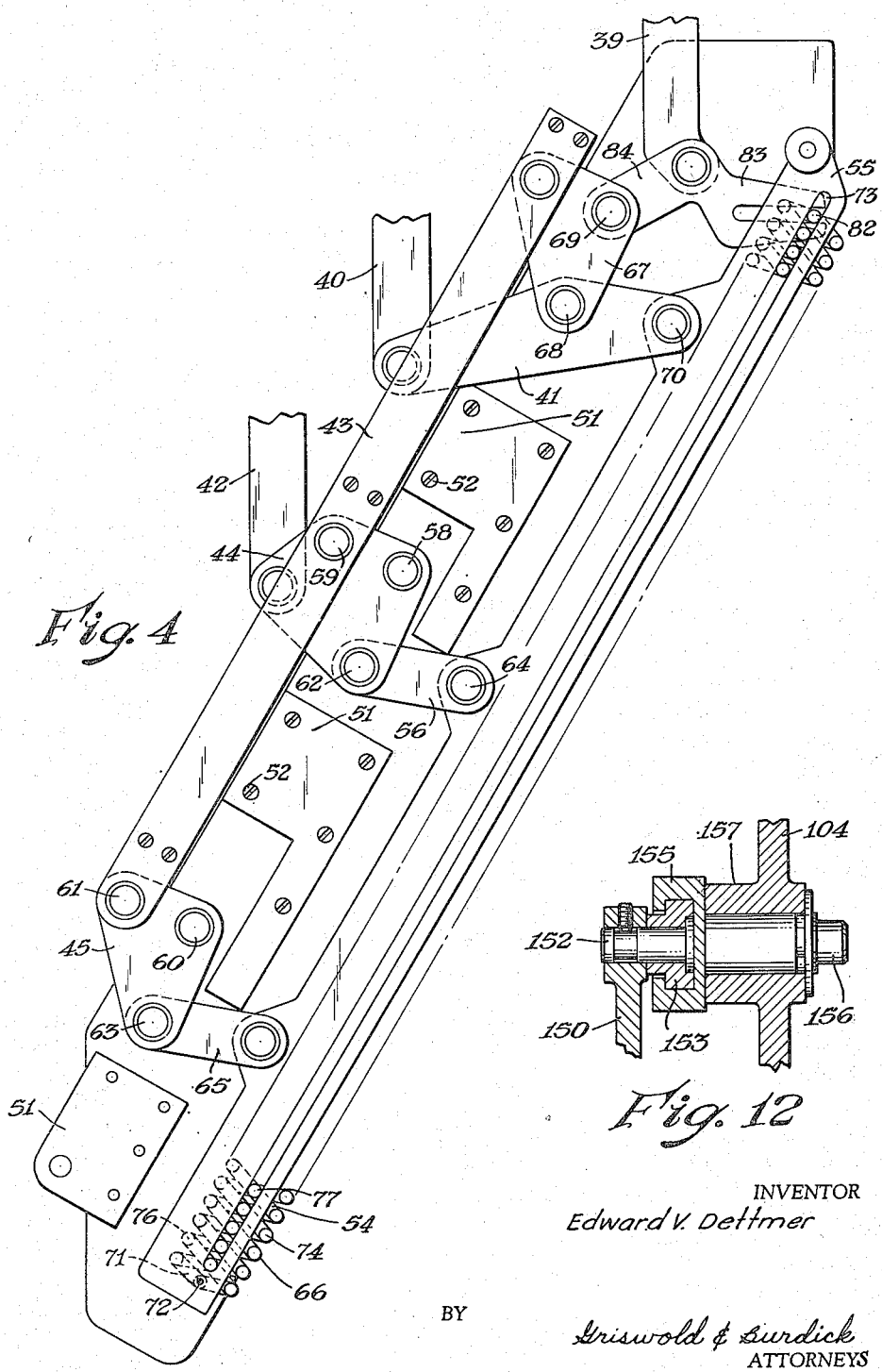

Nov. 24, 1953  E. V. DETTMER  2,659,931
APPARATUS FOR STRETCHING FILM
Filed March 3, 1952  7 Sheets-Sheet 4

INVENTOR
Edward V. Dettmer

BY
Griswold & Burdick
ATTORNEYS

Nov. 24, 1953

E. V. DETTMER 2,659,931

APPARATUS FOR STRETCHING FILM

Filed March 3, 1952

INVENTOR
Edward V. Dettmer

BY
Griswold & Burdick
ATTORNEYS

Nov. 24, 1953　　　　　E. V. DETTMER　　　　　2,659,931
APPARATUS FOR STRETCHING FILM
Filed March 3, 1952　　　　　　　　　　　　　7 Sheets-Sheet 6
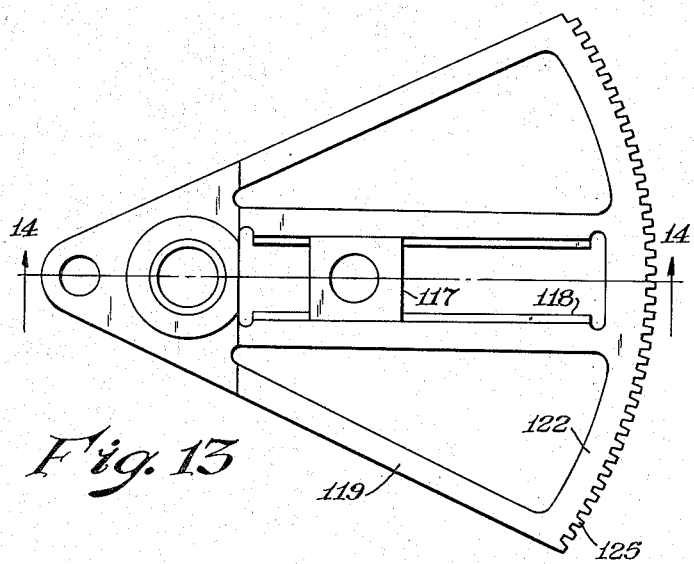
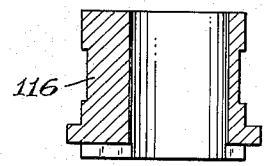
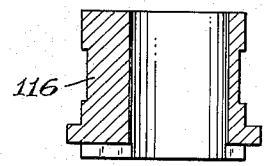
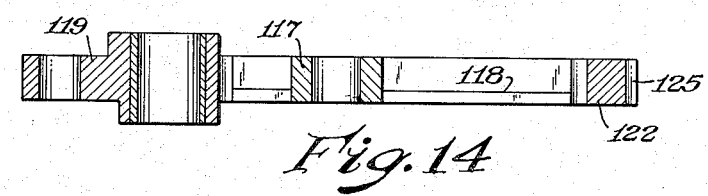
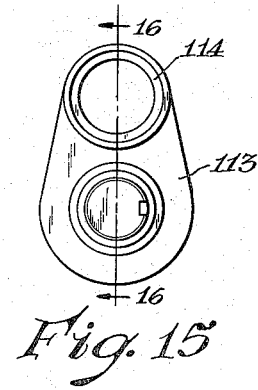
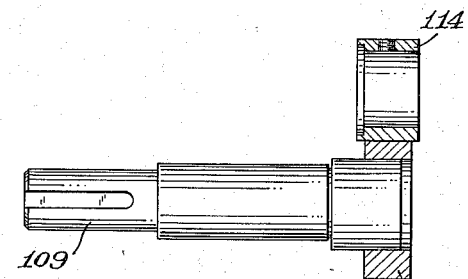
INVENTOR
Edward V. Dettmer
BY　*Griswold & Burdick*
　　　　ATTORNEYS Patented Nov. 24, 1953

2,659,931

UNITED STATES PATENT OFFICE 2,659,931

APPARATUS FOR STRETCHING FILM

Edward V. Dettmer, Bay City, Mich., assignor to The Dow Chemical Company, Midland, Mich., a corporation of Delaware Application March 3, 1952, Serial No. 274,631

5 Claims. (Cl. 18—1)

This invention relates to apparatus for stretching film both longitudinally and transversely. It relates in particular to apparatus for stretching tubular organic plastic film simultaneously in two directions to effect orientation thereof.

It is well known that organic plastics may be extruded in tubular form and stretched by internally applied pneumatic or hydraulic pressure, to give strong products. In the case of crystalline polymers, such stretching results in crystalline orientation parallel to the surface planes of the film and the product has highly desirable properties. The use of internally applied fluid pressure in the production of oriented film tubes presents various disadvantages which should be apparent. Thus, local failure of the tube results in loss of the fluid expansion medium and reestablishment of the internal fluid pressure requires delay in production.

It has been proposed to extrude organic plastics as flat sheets and to seize the edges of the advancing sheet in clamps which are forwarded along diverging paths at an accelerated rate to effect both longitudinal and transverse stretching. Because of the initially yielding nature of the extruded product, the clamps employed in such apparatus commonly tear the sheet, and effective control is lost. Further, due to the greater distances between the clamps as the film becomes stretched, the edges of the film develop large and unsightly scallops.

It would be desirable to be able to stretch organic thermoplastics without danger of interrupted production and without loss of control of the degree of stretch imparted to the film. It would be especially desirable to provide a new mechanical means for imparting any desired degree of controlled stretch to tubular film of organic plastic, especially to such film of normally crystalline plastic such as the well-known high vinylidene chloride copolymers. It is the principal object of this invention to provide a novel apparatus for accomplishing the above-stated desired ends.

To the accomplishment of the foregoing and related objects, the invention, then, comprises the machine hereinafter fully described and illustrated in the acccompanying drawings, the embodiments shown and described constituting, however, but one of many specific forms which the invention may take.

The apparatus of the invention is bilaterally symmetrical, in its preferred and illustrated form, so it will be understood that each part has an exact counterpart of opposite hand on the other side of the midline and only one set of parts needs description. The description will be made as though the apparatus were disposed to advance the tubular film vertically upwards during the stretching operation, but it should be understood that the film could be advanced and stretched by the same mechanism disposed horizontally.

The preferred apparatus comprises a stretching frame of general V-shape, each arm of the V being a thin, flat housing within which is mounted a linked parallel movement mechanism in a moveable frame, and mechanism for moving the said frame laterally out of the housing to cause engagement between the tips of the links of the parallel movement mechanism and the film; means for moving the frame and its contained elements upwardly parallel to the outer edge of the V while in contact with the film; means for elongating the parallel motion mechanism while the latter is moving upwardly in contact with the film, to stretch the film longitudinally; means for retracting the frame into the housing and for returning it to its original position; means for recompressing the links of the parallel motion mechanism while the latter is out of contact with the film; and a drive for actuating said various means repetitively in the same sequence simultaneously with the corresponding movements of the counterparts of each of said means in the other arm of the V-shaped frame. In cooperation with the present apparatus, there is a source of continuous supply of unoriented, stretchable plastic film as well as means for cutting the fully stretched film to form two flat sheets, and means for taking the stretched film sheets away from the stretching apparatus. Instead of the illustrated apparatus, having two flat housings in a single plane for stretching the film, there may be used three such housings disposed to form a pyramidal structure having an equilateral triangular base. Each of the housings is then disposed in a plane bisecting the solid angle of the pyramid. Film tubes, stretched over such a frame, are kept entirely out of contact with all plane faces of the housing, being in contact only at the working edge of each housing. Each of the several members of the assembly, and at least one useful means for performing each of the movements and functions of the machine will be described in detail hereinafter, reference being had to several figures of the annexed drawings.

In the said drawings:

Fig. 1 is an end elevation of apparatus according to the invention;

Fig. 2 is a front elevation of the same apparatus with the film supply and film takeup not shown;

Fig. 3 is a detailed view of one of the stretching elements of the apparatus, with the cover plate partially cut away and with the linked parallel movement mechanism retracted and compressed as at the beginning of a cycle;

Fig. 4 is a view similar to that of Fig. 3, showing the stretching elements advanced into working position and with the parallel motion mechanism extended nearly to its maximum length;

Fig. 11 is a section taken along line 11—11 of Fig. 7;

Fig. 12 is a section taken along line 12—12 of Fig. 7;

Fig. 13 is an elevation of a part of the drive mechanism shown in Fig. 7;

Fig. 14 is a section taken along line 14—14 of Fig. 13;

Fig. 15 is a plan of a crank element shown in Fig. 7;

Fig. 16 is a side view of the same crank, partially in section;

Fig. 17 is a plan view of an eccentric bushing which forms a part of the mechanism which controls the motion of the element shown in Fig. 13;

Fig. 18 is a vertical section through the bushing shown in Fig. 17; and

General (Figs. 1 and 2)

Figure 9:
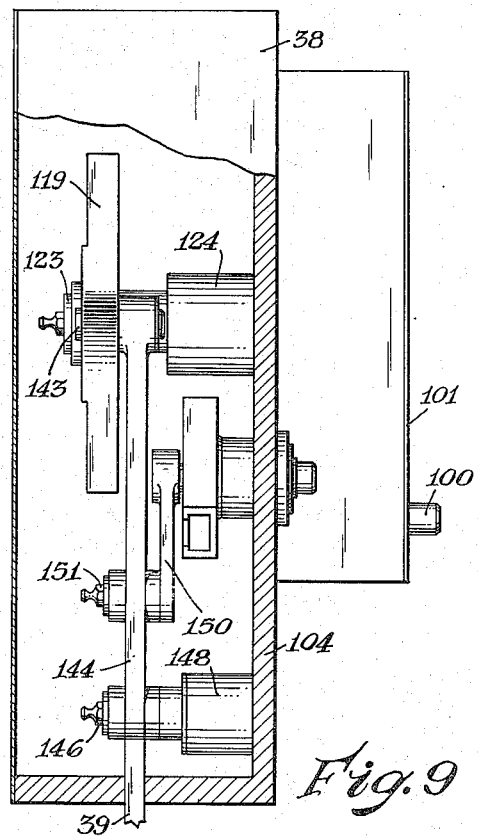
Fig. 9 is a vertical section taken along line 9—9 of Fig. 7.
Figure 5:
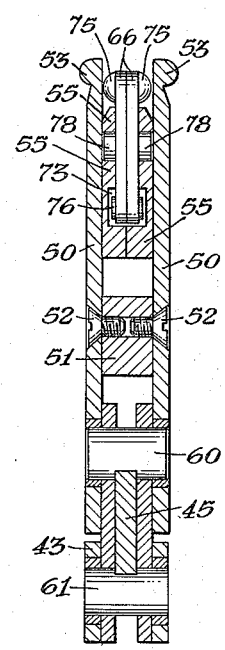
Fig. 5 is a section along line 5—5 of Fig. 3.
Figure 6:
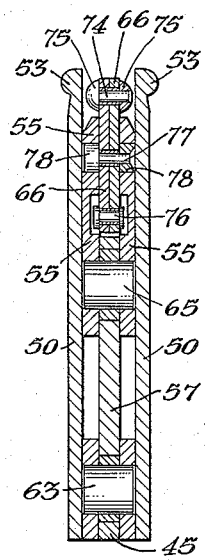
Fig. 6 is a section along line 6—6 of Fig. 3.
Figure 10:
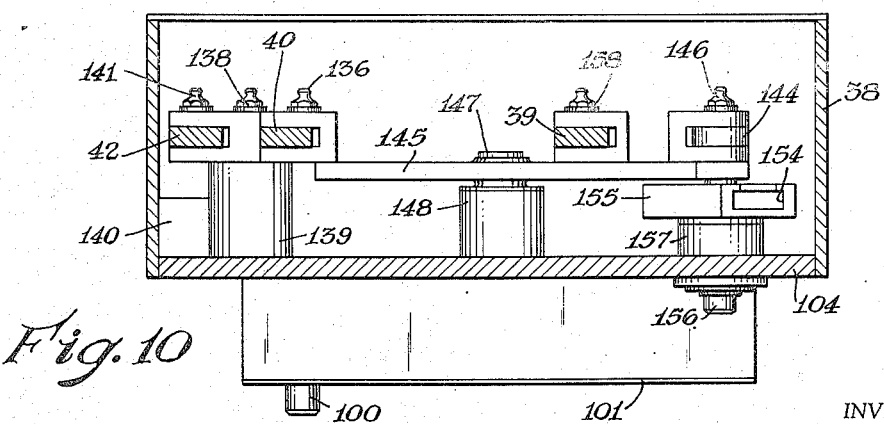
Fig. 10 is a cross-section taken along line 10—10 of Fig. 7.
Figure 8:
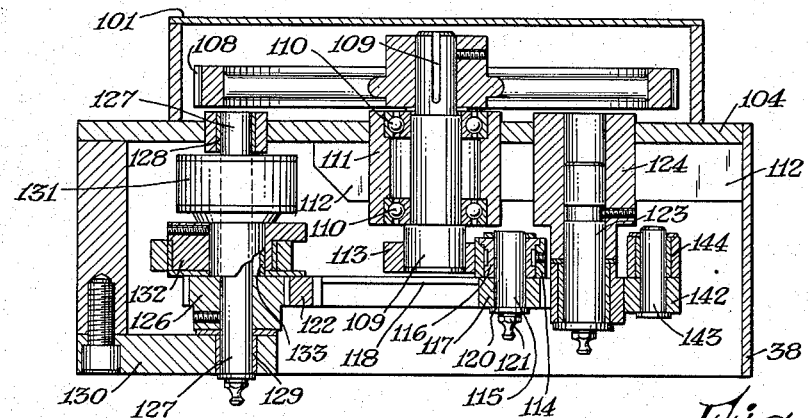
Fig. 8 is a cross-section taken along line 8—8 of Fig. 7.

The apparatus of the invention is mounted in a supporting frame 30, near the bottom of which is a horizontally disposed guide roll 31 around which flattened tubular film 32 may be fed to the apparatus from a source, not shown. The stretching frame, consisting generally of a pair of upwardly diverging flat housings 33, is mounted in a vertical plane which, if extended downwardly from the housings 33, is roughly tangent to the guide roll 31. Near the outermost upper end of each housing 33 is mounted a slitting blade 34 to sever the stretched tubular film reaching that point into two flat sheets 35 which pass over guide rolls 36 to wind-up rolls 37. Mounted over frame 30 directly above housings 33 are two gear boxes 38, each containing the drive and sequence controls for the stretching mechanism contained in one of the housings 33. Projecting downwardly from each gear box 38 and extending into the adjacent housing 33 is a lever 39 which actuates the linked parallel movement mechanism contained in said housing 33, which mechanism effects longitudinal stretching of film 32 and will be described more fully hereinafter. Another lever 40 also extends downwardly from gear box 38 to actuate, through lever 41, the conveyor assembly contained in housing 33, said conveyor assembly serving to move film 32 upward over the diverging housings 33 constituting the radial stretching frame, as will be described in detail below. A third lever 42 extends downwardly from gear box 38 and engages link 43, movement of which parallel to the inner side of one of the diverging housings 33, acting in part through bell cranks 44 and 45, serves to move the aforesaid conveyor assembly into and out of engagement with film 32, as will also be more fully explained. The diverging housings 33 are hinged together near their lower extremities by a hinge link 46 and are suspended from an upper transverse member of frame 30 by means of laterally adjustable brackets 47, the position of which determines the angle between housings 33 and thus controls the amount of radial stretch to be imparted to the tubular film 32.

The stretching frame and contained mechanism (Figs. 3–6)

Each housing 33 comprises a pair of elongated rigid plates 50 held apart and in a fixed relationship by spacer elements 51 to which plates 50 are secured as by machine screws 52. The outer edges 53 of rigid plates 50, with which film 32 comes in contact in the course of its passage over the stretching frame, are smoothly rounded, as shown in section in Figs. 5 and 6 and are preferably slightly protrusive beyond the outer planes of plates 50, to hold such film out of contact with the flat faces of said plates. The film conveyor assembly is mounted between plates 50 of housing 33, and consists generally of a linked parallel movement mechanism 54 carried between an interconnected pair of matching plates 55 each of which is longitudinally grooved for movement of mechanism 54. The conveyor assembly lies parallel to the rounded lateral edges 53 of plates 50 and is supported by and caused to move through lever 41, link 56 from bell crank 44, and link 57 from bell crank 45.

Movement downward of lever 42 causes partial counterclockwise rotation (in the illustrated view of Figs. 3 and 4) of bell crank 44 about its fixed pivot point 58. This results both in a downward movement of link 43, which is secured to bell crank 44 by pivot 59, and a counterclockwise partial rotation of bell crank 45 about its fixed pivot 60, the force being exerted by link 43 acting through pivot 61. Bell crank 67 is simultaneously given corresponding rotation by the motion of link 43. Bell cranks 44 and 45, in the course of such partial counterclockwise rotation, thrust against links 56 and 57, which are attached thereto by pivots 62 and 63, respectively, and links 56 and 57, acting in parallel through pivots 64 and 65, push plates 55 and their confined linked parallel movement mechanism 54 outwardly so that the rounded ends of the individual links 66 of said mechanism protrude beyond the confines of the cover plates 50 of housing 33. Movement upward of lever 42 reverses the movements just described and retracts the conveyor mechanism from the position shown in Fig. 4 to that shown in Fig. 3.

Movement downward of lever 40 depresses the outer end of lever 41, and the inner end of lever 41, beyond its fulcrum 68, moves upward, parallel to the outer edge of plates 50. Since lever 41 is connected through pivot 70 to matched plates 55, downward movement of lever 40 results in an upward movement of the film conveyor mechanism including plates 55 and the linked parallel movement mechanism 54. Movement upward of lever 40 results in reversal of the movements just described.

Links 66 of the parallel movement mechanism 54 do not occupy the entire grooved length of plates 55, there being several inches available for expansion of mechanism 54 when the interconnected links 66 are compressed. The two lowermost links 71 are shorter than the others and are secured to plates 55 by a single rivet 72 beyond the lower end of slot 73. At their free ends, the short links 71 are hinged to longer links 66. These, in turn, are hinged near their extremities to other links 66 in the manner of a pantograph. The pivot rivets 75 connecting the successive links 66 of the pantographic parallel movement mechanism 54 at the ends closest to the outer edge of housing 33 have rounded roller caps 75 at both ends to prevent any sharp edges from contacting film 32 when mechanism 54 projects beyond the confines of plates 50. The pivot rivets 76 connecting the inner ends of links 66 of the pantographic mechanism 54 do not require rounded caps 75. Each link 66 is drilled at its center to accommodate a connecting pin 77 which passes through two crossing links 66 and is provided at its ends with roller caps 78 of a size to roll in grooves 73 of the matched plates 55 of the mechanism 54. Beyond the last of full links 66 at the upper end of mechanism 54 are two half-links 79, each attached through a rivet 74, 76 to one of the last links 66, and both being fastened together and to a single link 80, adapted to slide longitudinally in groove 73, by rivet 81 which is provided with roller caps 78. The longitudinal link 80 has a pin 82 projecting therethrough near its upper end whereby it may be grasped to impart either an elongating or a contracting force to the whole linked parallel motion mechanism 54.

Lever 39 has an outwardly directed fork 83 at its lower extremity which is positioned to span the projecting end of pin 82. Since the conveyor assembly moves in and out of housing 35 due to movement imparted to link 43 through lever 42, and since lever 39 and its forked extension 83 are held at a fixed distance from link 43 by means of pivoted link 84, fork 83 must be of sufficient length to retain its grasp on pin 82 in all positions which the conveyor assembly may assume. Movement upward of lever 39 pulls on link 80 and causes the linked parallel movement mechanism 54 to expand. As will be explained hereinafter, such expansion is caused to occur at a time when lever 42 is at its lower position and, accordingly, when links 66 project beyond plates 50 into contact with film 32. The elongation of mechanism 54 creates a greater distance between successive links 66, and a longitudinal stretching force is exerted on the film. Movement downward of lever 39 results in return of links 66 to a more compacted position.

*Sequence of movement of parts shown in Figs. 3-6*

A cycle of operation of the parts shown in Figs 3-6 may be deemed to start when lever 42 has just completed an upward stroke, lever 39 is near the bottom of its downstroke, and lever 40 is near the top of its upstroke. At this time, the conveyor mechanism is approaching its lowest position in housing 33, links 66 are compressed nearly as fully as possible, and the entire parallel movement mechanism 54 is retracted fully within housing 33. Lever 42 is moved rapidly to the bottom of its stroke, causing links 66 to project beyond the confines of plates 50 by the time lever 39 is at the bottom and lever 40 at the top of their strokes. While lever 42 remains stationary at the lower end of its stroke, lever 40 begins moving downward and lever 39 simultaneously begins moving upward. These respective movements cause the entire conveyor assembly to move upward, parallel to the edges 53 of plates 50, and effect elongation of the parallel movement pantographic mechanism 54, causing links 66 to spread gradually further apart. Lever 42 remains stationary until lever 40 has gone to the bottom of its stroke, by which time lever 39 has also finished its upward stroke. Lever 42 then makes its upward stroke rapidly, retracting the conveyor mechanism within housing 33 and out of contact with film 32 before any substantial downward movement of lever 39 compresses links 66 and before mechanism 54 is moved downward as a result of the upstroke of lever 40. Movements of levers 39 and 40 are continuous, and opposite. Movement of lever 42 is a continuous and rapid up and down stroke followed by a dwell period before the next upstroke. Stretching and forwarding of the film 32 occurs while lever 42 is in its dwell period. The said dwell period is preferably from 2 to 3 times as long as the time required for one complete up and down stroke of lever 42.

*The gear box and drive mechanism (Figs. 7-18)*

There is illustrated in Figs. 1 and 2 a gear box 38 which is said to house the mechanism for driving the apparatus shown in detail in Figs. 3-6 and for controlling the cyclic movements of that apparatus. One suitable drive for accomplishing these purposes is shown in considerable detail in Figs. 7-18.

As illustrated in Figs. 7-10, the mechanism in gear box 38 is driven from an external source, not shown, through drive shaft 100. Shaft 100 passes through the rearwardly projecting housing 101 of box 38 and is supported by and is rotatable in bearings 102 mounted in a cylindrical boss 103 (Fig. 11) protruding into the main body of box 38 from its main structural rear wall 104. Boss 103 is stabilized against oscillation by structural brace 105 (Fig. 7) secured to the side wall of box 38. Within the rearwardly projecting housing 101, a pinion 106 is secured to shaft 100 as by set screw 107. Pinion 106 is in driving engagement with a large spur gear wheel 108 mounted in housing 101 on a centrally disposed shaft 109 which projects forward into box 38 through bearings 110 in cylindrical boss 111 which is kept rigid by horizontal and vertical braces 112 welded to back plate 104. The forward end of shaft 109 carries a crank 113 (Figs. 15 and 16 for crank details), the outer or revolving end of which is a cylindrical sleeve 114 in which is carried a forwardly extending crank pin 115 in eccentric bushing 116 (Figs. 17-18) to make possible slight variations in the effective radius of revolution of the crank 113. The forward end of pin 115 passes through and is free to turn in a rectangular sliding block 117, the latter being rabbeted to provide a sliding fit in the slot 118 of yoke 119, to be described later. Block 117 is held in place on crank pin 115 by a washer 120 and bolt 121.

Yoke 119 resembles a sector of a circle, its arcuate end 122, however, having a radius of curvature somewhat shorter than the overall length of the yoke. The yoke 119 is pivoted on fixed shaft 123 which is carried in a cylindrical boss 124 through the back wall 104 of box 38. Boss 124 is held rigid by braces 112 welded to box 38. As crank 113 rotates about its shaft 109, block 117 slides along slot 118, causing yoke 119 to rock up and down around its pivot shaft 123. The arcuate end 122 of yoke 119 carries on its outer edge a spur-toothed rack 125 which engages a pinion 126 on shaft 127. Shaft 127 is mounted for rotation between bearing 128 in rear wall 104 of box 38 and bearing 129 in front bracket 130 carried by the side wall of box 38. Just ahead of rear bearing 128 there is carried on shaft 127 an over-running clutch 131 which is connected on its forward face to an eccentrically mounted disk crank 132, the bore of which is large enough so that shaft 127 passes through the center thereof without frictional contact between shaft 127 and sleeve 133 of crank 132. Pinion 126 has a circumference just equal to the length of rack 125, so pinion 126 makes exactly one complete revolution for each stroke of yoke 119. If and when backlash develops in gears 125, 126, this same relationship may be maintained by adjusting the position of eccentric bushing 116 relative to the center of crank pin 115, to adjust the effective length of crank 113. While pinion 126 turns in response to every movement of yoke 119, clutch 131 permits the eccentric crank 132 to turn only when shaft 127 is being driven in one direction, for example, it may be arranged for crank 132 to turn only when rack 125 of yoke 119 is on its upstroke. Such a condition is assumed in Figs. 19-22, to be described later.

Crank 132 turns in a fixed bushing 134 of web 135, causing the latter to rise and fall once in each revolution of the crank. The lower end of web 135 is connected by a crank pin 136 to one end of a rocker arm 137 which is pivoted on shaft 138 mounted in cylindrical boss 139, the latter being welded in back plate 104 and braced by bracket 140. The other end of rocker arm 137 is hinged to lever 42 by means of pin 141.

Figure 7:
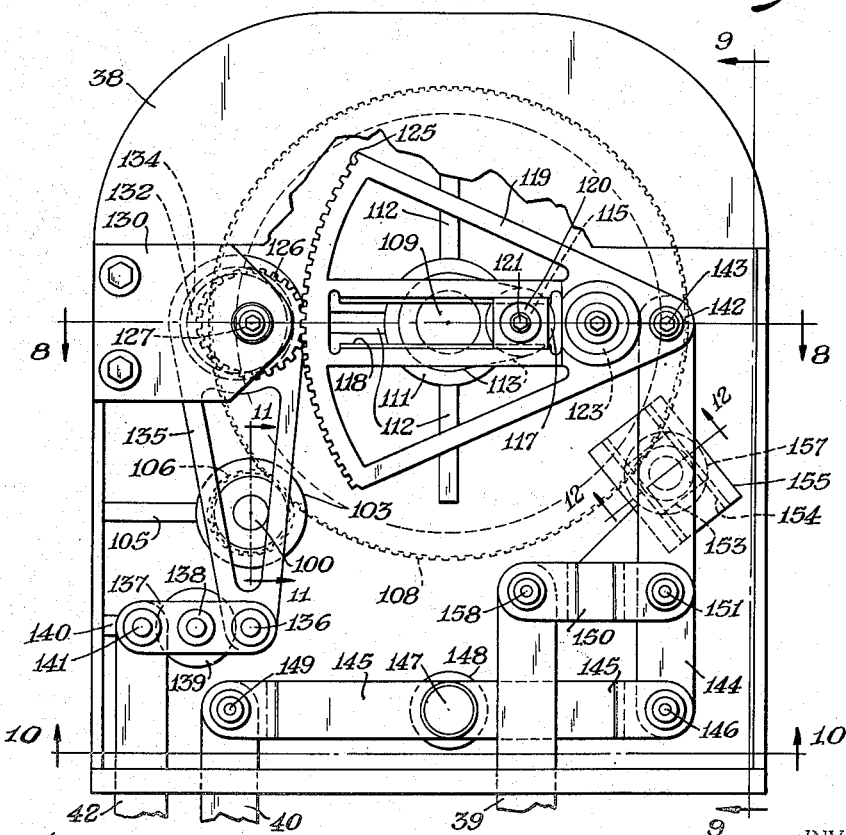
Fig. 7 is a front elevation of a drive for the stretching elements.
Figure 19:
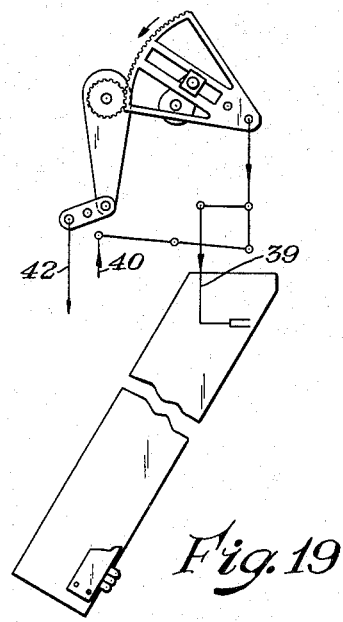
Figs. 19–22 are diagrammatic elevations of the apparatus shown in Fig. 2, illustrating the relative positions of the principal parts at several stages in each complete cycle of operation.
Figure 20:
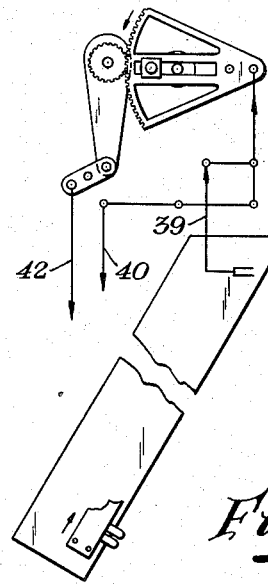
Figure 21:
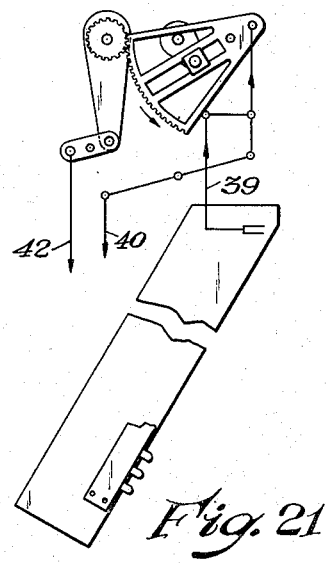
Figure 22:
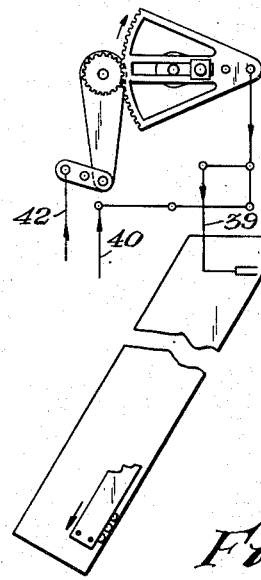

The apex 142 of yoke 119 is hinged, by means of pin 143 to a connecting link 144, the upper end of which necessarily describes an arc upon movement of yoke 119. The lower end of link 144 is hinged to a long rocker arm 145 by means of pin 146. Rocker arm 145 is pivoted near its center on shaft 147 in boss 148, and is hinged at its far end to lever 40 by means of pin 149. About one-third of its length from the bottom, link 144 is hinged to a lower corner of bell crank 150 by pin 151. The upper corner of bell crank 150 carries a crank pin 152 (Fig. 12) on which is mounted a rectangular block 153, adapted to slide in channel 154 of adjusting head 155. The adjusting head is fixed securely to shaft 156 which passes through cylindrical boss 157 in wall 104 of box 38. The angle at which head 155 is turned, relative to the vertical line of travel of link 144, determines the length of the vertical movement of the third corner of bell crank 150. When head 155 is turned as shown in Fig. 7, the vertical stroke imparted to lever 39 by crank 150 through pin 158 is small as compared with the stroke it would have if head 155 were to be turned 90° clockwise from its illustrated position. Variation in the stroke of lever 39 causes a corresponding variation in the amount of longitudinal stretch which is imparted to film being worked on by the apparatus.

The two opposite movements of yoke 119 and its associated rack 125 may be referred to as a conveying stroke and a return stroke. During the conveying stroke, lever 42 remains in its lowest position, as clutch 131 prevents crank 132 from turning with pinion 126. At the same time, as rack 125 moves down, the apex 142 of yoke 119 moves up, depressing lever 40 and raising lever 39, causing conveyor mechanism 54 to move upward while its extended links 66 are stretching further apart. When rack 125 has reached its lowest point and crank 113 is about to cause it to reverse its direction, the conveying stroke is ended and the return stroke begins. During the return stroke of yoke 119, clutch 131 causes crank 132 to turn with pinion 126, and lever 42 is thus caused to make a complete up and down stroke on one upward stroke of rack 125. Thus, on the return stroke, the conveyor assembly is retracted as lever 42 moves up, mechanism 54 is lowered as lever 40 moves up, links 66 are compressed as lever 39 moves down, and the conveyor assembly is again moved out into contact with the film as lever 42 moves down again.

The relative duration of the conveying stroke and the return stroke of rack 125 is controlled by the ratio between the length of the entire locus of the end of crank 113 and the amount of such locus which is subtended by lines drawn tangent to said locus from the pivot point at the center of shaft 123. The said pivot point is very close to the locus of crank 113, so that about 67 to 75 per cent of the crank orbit represents the conveying stroke while only 33 to 25 per cent of that orbit is required to effect the return stroke. The latter is then of only ⅓ to ½ the duration of the conveying stroke.

In one embodiment, in which the length of and the angle between housings 33 caused a radial stretch to about 3.5 times the original tubular circumference, mechanism 54 was capable of 1.5 inches expansion on each upstroke of lever 39, and each downstroke of lever 40 advanced the film one-half inch. In passing the 30-inch length of housing 33, the film was stretched 1.5 inches each of 60 times. Thus, the final length of the oriented film was 4 times the length of the unoriented film from which it was made. The apparatus was driven at a rate to provide 300 conveying strokes per minute, so that about 12.5 feet of unoriented film tube was fed to the machine each minute, and oriented film was removed at a linear rate of 50 feet per minute. The area of the discharged stretched film was 14 times that of the original feed.

Figs. 19-22 illustrate schematically one cycle of movements, both in the illustrated embodiment of the drive mechanism and in the stretching frame, whereby a tubular film is advanced and stretched over the apparatus.

It is recalled that Figs. 3-22 have shown only the right half of the bilaterally symmetrical apparatus of Fig. 2, and that, for each part shown in these drawings there is a counterpart of opposite hand on the left side of the machine. Corresponding parts on opposite sides of the midline perform their respective functions simultaneously. Accordingly, it is essential to turn both drive shafts 100 at identical rates, and it is desirable to supply the power for this purpose from a single motor, through any suitable interconnected gear mechanism, or by chain and sprocket drive, the arrangement of any such integrating means being within the skill of the art.

As has been mentioned before, there may be used either two or three of the stretching and conveying elements, disposed symmetrically within the film tube to be stretched, and diverging at an angle to provide the desired radial stretching.

I claim:

1. Apparatus for stretching previously unoriented tubular film both radially and longitudinally comprising: a stretching frame, the outer edges of which diverge symmetrically from the end at which film is fed to said frame, of a length and disposed with said outer edges at an angle to provide the desired radial stretch to tubular film advanced thereover; said stretching frame comprising 2 to 3 flat housings, each having a spaced pair of matching cover plates; a flat conveyor assembly in each said housing, mounted for movement parallel to the outer edges of the housing and for movement out of the housing into contact with film stretched over the housings, said conveyor assembly comprising a pantographic linked parallel movement mechanism mounted for elongation and contraction in said assembly; a lever means for moving the conveyor assembly to project the outer ends of the link members of the linked parallel movement mechanism out of the housing and for retracting the assembly wholly within the housing; a second lever means for moving the conveyor assembly successively in opposite directions parallel to the outer edge of the housing; a third lever means for elongating the linked parallel movement mechanism while the latter is projecting beyond the edge of the housing and for contracting said mechanism when it is retracted within the housing; a drive mechanism for each of said housings connected with said levers for effecting in repetitive sequence: (1) projection of the parallel movement mechanism beyond the edge of its housing while the links thereof are contracted and when the said assembly is closest to the film-feed end of the housing; (2) movement of the conveyor assembly parallel to the edge of the housing in the direction of movement of the film and simultaneous elongation of the pantographic mechanism; and (3) simultaneous contraction of the parallel movement mechanism and retraction and return of the conveyor assemblies to their original positions; means for synchronizing the several drive mechanisms so that each performs the same functions at the same time; and, a source of power for activating said drive mechanisms.

2. Apparatus for stretching previously unoriented tubular film both radially and longitudinally, comprising: a flat stretching frame, the lateral edges of which diverge, of a length and disposed with said outer edges at an angle to provide the desired radial stretch to tubular film advanced thereover; said stretching frame comprising a pair of flat housings, each having a spaced pair of matching cover plates; a flat conveyor assembly in each said housing, mounted for movement parallel to the outer edges of the housing and for movement out of the housing into contact with film stretched over the housings, said conveyor assembly comprising a pantographic linked parallel movement mechanism mounted for elongation and contraction in said assembly; a lever means for moving the conveyor assembly to project the outer ends of the link members of the linked parallel movement mechanism out of the housing and for retracting the assembly wholly within the housing; a second lever means for moving the conveyor assembly successively in opposite directions parallel to the outer edge of the housing; a third lever means for elongating the linked parallel movement mechanism while the latter is projecting beyond the edge of the housing and for contracting said mechanism when it is retracted within the housing; a drive mechanism for each of said housings connected with said levers for effecting in repetitive sequence: (1) projection of the parallel movement mechanism beyond the edge of its housing while the links thereof are contracted and when the said assembly is closest to the film-feed end of the housing; (2) movement of the conveyor assembly parallel to the edge of the housing in the direction of movement of the film and simultaneous elongation of the pantographic mechanism; and, (3) simultanous contraction of the parallel movement mechanism and retraction and return of the conveyor assemblies to their original positions; means for synchronizing the several drive mechanisms so that each performs the same functions at the same time; and, a source of power for activating said drive mechanisms.

3. The apparatus claimed in claim 2, wherein the stretching frame lies in a vertical plane and the film is stretched upward thereover.

4. The apparatus claimed in claim 1, wherein each element of the conveyor assembly and of the housing which is adapted to contact the tubular film along an internal angle thereof during the forwarding and stretching operations is rounded to present only smooth faces to such film.

5. In combination with the apparatus claimed in claim 1, a drive for the mechanism in each housing comprising: a crank driven by the power source and mounted to rock a pivoted element through a relatively slow stroke and a relatively rapid return stroke, the said rocking element carrying a curved rack at one end distant from the pivot point and connected at the opposite side of and close to the pivot to links disposed for driving simultaneously and in opposite directions the lever for moving the conveyor assembly parallel to the outer edge of the housing and the lever for elongating the parallel movement mechanism; the said curved rack being in driving engagement with a second crank mounted for one complete vertical reciprocation only when the said pivoted element moves in the direction of its rapid return stroke, the vertically reciprocating crank being linked to the lever for moving the conveyor mechanism into and out of the housing of the stretching apparatus, said second crank being mounted to remain stationary during the long stroke of the rack, in the position which holds the conveyor mechanism extended beyond the edge of the housing.

EDWARD V. DETTMER.

References Cited in the file of this patent
UNITED STATES PATENTS

| Number | Name | Date |
|---|---|---|
| 2,473,404 | Young | June 14, 1949 |
| 2,571,355 | Gardner | Oct. 16, 1951 |
| 2,582,165 | Rosenfeld | Jan. 8, 1952 |